United States Patent [19]

Yokoyama et al.

[11] 4,146,502
[45] Mar. 27, 1979

[54] PROCESS FOR PRODUCING CATALYST COMPONENTS FOR OLEFIN POLYMERIZATION

[75] Inventors: Masuzo Yokoyama; Shoichi Masukawa; Tsunenori Takahashi, all of Ibaraki; Hideo Sakurai, Yokkaichi; Makoto Kouno, Ibaraki; Shozo Ohkosi, Ibaraki; Satosi Ohtaka, Ibaraki, all of Japan

[73] Assignee: Mitsubishi Petrochemical Company Limited, Japan

[21] Appl. No.: 839,843

[22] Filed: Oct. 6, 1977

[30] Foreign Application Priority Data

Oct. 7, 1976 [JP] Japan .................................. 51-120634
Aug. 12, 1977 [JP] Japan .................................. 52-96689

[51] Int. Cl.² .......................................... C08F 4/10
[52] U.S. Cl. .............................. 252/429 B; 526/125; 526/137; 252/429 C
[58] Field of Search ........................ 252/429 B, 429 C

[56] References Cited

U.S. PATENT DOCUMENTS

| 3,206,447 | 9/1965 | Zelinski | 252/429 B X |
| 3,223,694 | 12/1965 | Farrar | 252/429 B X |
| 3,524,840 | 8/1970 | Durst | 252/429 B X |
| 3,859,231 | 1/1975 | Kochhar et al. | 252/429 B X |
| 3,953,414 | 4/1976 | Galli et al. | 252/429 C X |
| 3,972,862 | 8/1976 | Tornquist et al. | 252/429 B X |

Primary Examiner—Patrick Garvin
Attorney, Agent, or Firm—Robert E. Burns; Emmanuel J. Lobato; Bruce L. Adams

[57] ABSTRACT

A catalyst component, which is to be combined with an organoaluminum component to form a Ziegler catalyst for olefin polymerization, is produced by treating (1) a solid composition resulting from a process of combining a magnesium halide such as magnesium chloride, an electron donor compound such as ethyl benzoate and a titanium halogen compound such as titanium tetrachloride with (2) an interhalogen compound or a halogen such as iodine trichloride.

16 Claims, No Drawings

PROCESS FOR PRODUCING CATALYST COMPONENTS FOR OLEFIN POLYMERIZATION

BACKGROUND OF THE INVENTION

This invention relates to the production of titanium-containing compositions suitable for use as transition metal components of Ziegler catalysts. More specifically, the invention relates to a process for producing Ziegler type catalyst components for polymerization of α-olefins of remarkably high stereoregularity or crystallinity and polymerization activity by processing solid components containing magnesium halides, electron donor compounds, and titanium compounds.

In the prior art, Ziegler catalysts have been known as catalysts for α-olefin stereospecific polymerization. Furthermore, for the purpose of further improving the activity and stereoregulating capability of these catalysts, various methods have been proposed.

Among these various improved methods, the process of producing a solid catalyst component wherein a Ziegler catalyst transition metal catalyst component is caused to contain therein a magnesium compound (as disclosed in Japanese Patent Publication Nos. 41676/1972 and 46269/1972) markedly improves the catalyst particularly with respect to its activity. These methods, however, have been proposed principally for producing high activity catalysts for polymerization of ethylene, and, while their activity is of extremely high value when they are used as catalysts for polymerization of α-olefins such as propylene, the stereoregularity of the resulting polymer conversely decreases to a remarkable degree, whereby their practical value as catalysts for stereospecific polymerization of α-olefins is greatly impaired, as is also known.

Accordingly, various methods of improving the stereo-regularity of the polymers formed in the polymerization of α-olefins in which transition metal solid catalyst components of Ziegler catalysts containing a magnesium compound are used have been proposed (e.g., in the specifications of Japanese Patent Laid Open Nos. 9342/1972, 12659/1975, and 57789/1976). A common characteristic of these methods is that an electron donor compound such as an amine or an ester is caused to be contained in the Ziegler solid catalyst component containing a titanium compound and a magnesium halide compound.

In addition, as is known through disclosures such as the specifications of Japanese Patent Laid Open Nos. 16986/1973, 16987/1973, and 16988/1973, methods of causing both the transition metal catalyst component and the trialkylaluminum component to be combined therewith to form a Ziegler catalyst to contain an electron donor compound (by addition and complex formation or like method) have also been proposed. By causing the Ziegler catalyst component containing a magnesium halide compound in its transition metal catalyst component to contain an electron donor compound, the stereoregularity of the polymer thus formed is considerably improved.

However, the stereoregularities of the polymers produced by the above described various methods are still inadequate. Accordingly, in order to obtain a polymer having the physical properties of a polymer in market demand, it becomes necessary to remove the atactic polymers from the α-olefin polymers obtained by these catalyst systems, and this necessity is one cause of the complexity of the polymer production process.

Furthermore, there are some catalyst systems which, while having high activity per titanium atom, do not necessarily have high activity per solid catalyst component, and on this point, also, improvement is desired.

SUMMARY OF THE INVENTION

It is an object of this invention to provide a process for producing a titanium catalyst component which, in a stereospecific polymerization of an α-olefin, will cause the activity per titanium atom to become remarkably high and, at the same time, the stereoregularity of the polymer formed to be very high. It is contemplated in this invention to achieve this object by treating with an interhalogen compound or a halogen a solid composition comprising a combination of (i) a magnesium halide, (ii) an electron donor compound, and (iii) a titanium halogen compound.

Accordingly, the process for producing a catalyst component for polymerization of olefins, in its broadest aspect, comprises treating with an interhalogen compound or a halogen a solid composition prepared by combining (i) a magnesium halide, (ii) an electron donor compound, and (iii) a titanium halogen compound.

The expression "causing a magnesium halide, an electron donor compound, and a titanium halogen compound to combine" does not mean only the case where these three compounds are caused to contact each other simultaneously but includes also a combination of these three compounds in any sequence in steps including those wherein washing and other process steps are interposed therebetween.

Accordingly, one and preferable embodiment of the production of a solid catalyst component of this invention comprises the following process steps:

(1) Treating a magnesium halide with an electron donor compound.

(2) Milling or grinding together a composition containing the magnesium halide thus obtained and a titanium halogen compound in liquid form substantially in the absence of an inactive solvent.

(3) Treating with an interhalogen compound or a halogen the composition containing magnesium halide thus obtained by milling.

(4) Treating the magnesium halide or the composition containing the magnesium halide with an inactive organic solvent simultaneously with or after the carrying out of the above process step (3). The words "milling" and "grinding" are used herein interchangeably.

While this invention in this embodiment comprises a combination of several process steps, there are a number of modes of practice of this embodiment depending on the sequence of carrying out the steps (3) and (4), as described hereinafter in detail. One of these modes of practice comprises causing the inactive organic solvent to be present when the composition comprising the magnesium halide, the electron donor compound, and the titanium halogen compound (i.e., the product formed after the step (2) has been carried out) is treated with the interhalogen compound or the halogen. Another procedure of practice comprises treating the compositions with the inactive organic solvent after the composition been subjected to treatment with the interhalogen compound or the halogen.

Although the form in which the magnesium halide exists in the product of the above process steps (1), (2), and (3) is not clearly known, the product of these steps (1), (2), and (3) will be referred to as "composition containing magnesium halide" in this invention.

A Ziegler catalyst constituted by the titanium composition produced by a method of this character has a unique feature in that the stereoregularity of the resulting polymer is excellent. Furthermore, the treatment with an interhalogen compound or a halogen not only has the effect of improving the stereoregularity of the polymer but also has the capability of increasing the activity per unit of titanium content. In addition, by the aforementioned preferable embodiment indispensably including the process step of treatment with an inactive organic solvent, the effect of producing a high activity per unit of solid catalyst component is also obtained.

Accordingly, by utilizing the high stereoregularity and high activity possessed by the titanium composition of this invention in a process on an industrial scale for producing an α-olefin polymer, it becomes possible to carry out the process of producing an α-olefin stereoregular polymer in an advantageous manner due to numerous benefits such as process simplification, reduction in monomer quantities required, and reduction in the consumption of auxiliary agents, electric power, and steam.

The nature, utility, and further features of this invention will be more clearly apparent from the following detailed description beginning with a consideration of general aspects of the invention and concluding with specific examples of practice constituting preferred embodiments of the invention.

DETAILED DESCRIPTION

The titanium composition according to this invention, that is, the catalyst component for olefin polymerization, comprises a product obtained by treating a solid composition obtained by combining a magnesium halide, an electron donor compound, and a titanium halogen compound with an interhalogen compound or a halogen. The meanings respectively of "combining" and "treating" are as set forth hereinbefore.

1. Solid Composition

(1) Constituents (i) Magnesium halide

For the magnesium halide, halides such as magnesium chloride, magnesium bromide, and magnesium iodide can be used. Among these, magnesium chloride is preferable. Furthermore, it is preferable that this magnesium halide be substantially anhydrous so that it will not have a deleterious effect on the catalyst performance.

In the production of the solid component of this invention, a mechanical contacting measure such as milling grinding is not necessarily required between the magnesium halide and the other constituent component (ii) or (iii), but in the case where milling is not carried out, it is desirable that the magnesium halide be milled or ground beforehand.

(ii) Electron donor compound

An electron donor compound suitable for use in the achievement of the objects of this invention is selected from various compounds each containing within its molecule at least one atom selected from atoms of oxygen, nitrogen, and phosphorus.

Examples of such compounds are ethers, esters, ketones, amines, and phosphorus compounds. More specific examples are as follows.

(1) Monoethers, diethers, and triethers having a total of from 2 to 12 carbon atoms as, for example, diethylether, di-n-butylether, di-n-amylether, and ethyleneglycol dimethyl or dibutylether;

(2) Carboxylic acid esters derived from a carboxylic acid having from 1 to 12 carbon atoms and an alcohol having from 1 to 12 carbon atoms. Examples are aliphatic carboxylate esters such as ethyl acetate, vinyl acetate, methyl acrylate, methyl methacrylate, ethyl methacrylate, and octyl laurate; and aromatic carboxylate esters such as methyl benzoate, ethyl benzoate, phenyl benzoate, methyl toluylate, ethyl toluylate, ethyl anisate, and diethyl phthalate;

(3) Ketones having a total of from 2 to 12 carbon atoms as, for example, acetone, methyl ethyl ketone, and acetophenone;

(4) Amines having a total of from 1 to 12 carbon atoms as, for example, trimethylamine, diethylamine, octylamine and urea;

(5) Phosphorus compounds as, for example, tributyl phosphine, triphenyl phosphine, triphenyl phosphate, triphenyl phosphite, and hexamethylphosphoric triamide.

These compounds may be used in combinations of two or more thereof. For example, ethyl benzoate and n-butylether can be used. (Example A4 set forth hereinafter).

Of these compounds, esters are preferable. More specifically, carboxylic acid esters derived from a carboxylic acid hving from 1 to 12 carbon atoms and an alcohol having from 1 to 12 carbon atoms are preferable. Specific examples are those given hereinabove. The more preferable esters are lower alkyl ($C_1-C_6$) methacrylates and lower alkyl ($C_1-C_6$) benzoates.

(iii) Titanium halogen compound

A titanium halogen compound defined by the general formula Ti $(OR)_m$ $X_{n-m}$ (where R is an alkyl group, preferably an alkyl group having from 1 to 6 carbon atoms; X is a halogen; n is 3 or 4; m is zero or an integer from 1 to 4; and $n \geq m$) is ordinarily used.

More specifically, examples of tetravalent titanium halogen compounds are as follows.

(1) Titanium tetrahalides, for example, titanium tetrachloride, titanium tetrabromide, and titanium tetraiodide;

(2) Alkoxytitanium trihalides, for example, methoxytitanium trichloride, ethoxytitanium trichloride, and n-butoxytitanium trichloride;

(3) Dialkoxytitanium dihalides, for example, dimethoxytitanium dichloride and di-n-butoxytitanium dichloride;

(4) Trialkoxytitanium monohalides, for example, trimethoxytitanium chloride, and tri-n-butoxytitanium chloride.

Furthermore, examples of trivalent titanium halogen compounds are as follows.

(1) Titanium trihalide, for example, titanium trichloride, titanium tribromide, and titanium triiodide;

(2) Alkoxytitanium dihalides, for example, methoxytitanium dichloride, and n-butoxytitanium dichloride;

(3) Dialkoxytitanium halides, for example, dimethoxytitanium chloride, and di-n-butoxytitanium chloride.

Of these titanium halogen compounds, halides are preferable. That is, $TiX_4$ or $TiX_3$ are preferable. More specifically, preferable compounds are titanium tetrachloride, titanium trichloride, and the like.

In the aforementioned preferable embodiment of this invention, a titanium halogen compound in liquid form is used. While such titanium halogen compounds in liquid form have already been mentioned above, liquid titanium halogen compounds expressed by the formula $TiX_n$ (where X is a halogen and n is 3 or 4) or their complexes are, in general, used as liquid titanium halogen compounds. Among chlorine, bromine, and iodine, chlorine is preferable for use as the halogen. Of these titanium halogen compounds, those of solid form must be used in a state of having been complexed into a liquid form with a complexing agent such as an ether, a ketone, an amine, an amide, or the like.

(iv) Interhalogen compound and halogen

The interhalogen compound and halogen used in this invention is defined by the general formula $XY_n$ (where n = 2 when X = Y, and n = 1, 3, 5, or 7 when X ≠ Y, X and Y being halogens).

Specific examples are ClF, BrF, IF, BrCl, ICl, IBr, $ClF_3$, $BrF_3$, $IF_3$, $ICl_3$, (or $I_2Cl_6$), $ClF_5$, $BrF_5$, $IF_5$, $IF_7$, $Cl_2$, $Br_2$, and $I_2$. Of these halogen compounds, ICl, $ICl_3$, $Cl_2$, and $I_2$ are particularly preferable.

(v) Inactive organic solvent

While the inactive organic solvent probably cannot be said to be a constituent of the solid catalyst component of this invention, it is an indispensable material in the preferable embodiment of the invention.

For the solvent in the embodiment of this invention, aliphatic, alicyclic, and aromatic hydrocarbon compounds or haloderivatives thereof are used. Of these solvents halohydrocarbon solvents and aromatic hydrocarbon solvents are preferable. Specific examples are hexane, heptane, benzene, toluene, xylene, mesitylene, cyclohexane, methylcyclohexane 1,2-dichloroethane, propyl chloride, butyl chloride, chlorobenzene, and bromobenzene.

(2) Preparation of solid catalyst component

One mode of practice of this invention comprises first preparing a solid composition by combining a magnesium halide, an electron donor compound, and a titanium halogen compound and treating this solid composition with an interhalogen or a halogen.

(1) Preparation of solid composition

The solid composition is formed by combining the aforedescribed constituent components (i), (ii), and (iii). The expression "formed by combining" these constituent components as used herein means the obtaining of the solid composition by causing these three indispensable components and an optional auxiliary component as described above, in cases where it is used, to assume a state of mutual contact either at one time or in stages. Accordingly, the solid composition of this invention formed by combining the above stated components may be of various forms including a mere mixture of these components and a form wherein these components partly or in entirety are in a state wherein they are imparting some kind of mutual effect on each other or have reacted.

A number of specific processes in concrete terms for preparing this solid composition are set forth below, but it is to be understood that this invention is not limited to these preparation processes.

(a) An anhydrous magnesium halide which has been milled or ground is suspended in an inactive solvent, and a titanium halogen compound and an electron donor compound are added to the resulting suspension.

(b) An anhydrous magnesium halide and an electron donor compound are preparatorily milled or ground and then suspended in an inactive solvent, and a titanium compound is added to the suspension.

(c) At the time when the titanium compound is added in the above process (b), the electron donor compound is also added simultaneously.

(d) A magnesium halide is preparatorily treated with an electron donor compound, and the treated magnesium halide is milled or ground with a titanium halogen compound substantially in the absence of inactive solvent.

(e) A complex of a titanium compound and an electron donor compound is prepared beforehand, and preferably after the complex thus formed is isolated, it is mixed and ground with an anhydrous magnesium halide.

(f) An anhydrous magnesium halide, an electron donor compound, and a titanium halogen compound are simultaneously mixed and ground together.

(g) An anhydrous magnesium and an electron donor compound are mixed and ground together, while, separately, a titanium halogen compound and another portion of the electron donor compound are mixed and ground, and the resulting mixtures obtained separately are mixed and ground.

(h) An anhydrous magnesium halide is heat treated together with an electron donor compound in an inactive solvent thereby to obtain a solid which has swollen and been rendered into fine particles, and a titanium halogen compound is added thereto. If desired, the solid after this addition is further ground.

(i) An anhydrous magnesium halide is dissolved in a solvent such as an alcohol, and the solution is evaporated to dryness thereby to obtain a solid in fine particles. To this solid, a titanium halogen compound and an electron donor compound are added. Depending on the desirability, the solid is further ground after this addition.

The milling or grinding in the above processes, in general, is carried out for two hours or longer. This grinding time is ordinarily from 10 to 48 hours. It is desirable that this grinding be carried out in an inactive atmosphere. In the above production processes (a) and (i), it is also possible to add a grinding adjuvant such as $SiCl_4$ of a hydrocarbon halide (for example, as disclosed in Japanese Patent Laid Open No. 39287/1972) for the purpose of improving the particle properties of the solid composition obtained. Furthermore, an inorganic solid such as silica or an organic solid such as naphthalene, anthracene, and hexachlorobenzene can be present in mixed state in the solid composition for the purpose of decreasing the chlorine content in the solid composition.

(2) Composition

The compositional ratios of the three components, that is, (i) a magnesium halide, (ii) an electron donor compound, and (iii) a titanium halogen compound, contained in the solid composition are not limited and may be selected at will provided that the desired results are obtained. Ordinarily, the respective mole ratios of these components as expressed in the sequence of (i) the magnesium halide, (ii) the electron donor compound, and (iii) the titanium halogen compound are as follows.

(1,000 to 3):(10 to 0.1):1 (unity), preferably (500 to 5):(5 to 0.5):1 (unity).

While the three components (i) magnesium halide, (ii) electron donor compound, and (iii) titanium halogen compound are indispensable constituent components of the solid composition, auxiliary components can be contained additionally therein. Examples of auxiliary components are inorganic halides such as silicon tetrachloride and tin tetrachloride and hydrocarbon halides such as dichloroethane and n-butyl chloride.

(3) Contacting of solid composition with the interhalogen compound or halogen When the solid composition obtained by a process as described above is caused to contact the interhalogen compound or halogen, a titanium composition which is an objective composition of this invention, that is, a catalyst component for olefin polymerization, is obtained.

The quantity in which these halogen compounds are used is of the order of 0.001 to 20, preferably 0.005 to 10 in terms of mole ratio relative to the titanium compound in the solid composition.

In the case where these halogen compounds are in liquid or solid form, a method such as that wherein they are caused to contact the solid composition by a mechanical procedure such as milling or grinding and then washed in an inactive organic solvent can be practiced. Ordinarily, however, these halogen compounds are caused to contact the solid composition for a contact time of the order of from 30 minutes to 5 hours at a temperature of the order of from room temperature to 150° C. in the presence of an inactive organic solvent. After this contacting, it is preferable that thorough washing be carried out.

For the inactive organic solvent in this case, an aliphatic, alicyclic, or aromatic hydrocarbon compound or a halohydrocarbon compound is used. Of these compounds, a hydrocarbon halide diluent is preferable.

This treatment with the halogen compounds imparts a remarkable effect simultaneously with respect to both the activity and the stereoregularity of the performance of the solid catalyst component.

(4) Preparation of preferable titanium composition

As stated hereinabove, the preferable embodiment of the present invention comprises pretreating a magnesium halide with an electron donor compound, milling or grinding together the magnesium halide thus pretreated and a liquid titanium halogen compound substantially in the absence of an inactive solvent thereby to form a solid, and treating this solid with an interhalogen compound or a halogen at or after the treatment with an interhalogen or a halogen, the solid composition is treated with an inactive organic solvent.

(1) Preparation of the solid catalyst component

(i) Contacting of the magnesium halide and electron donor compound

The method of treating the magnesium halide with the electron donor compound, which can be said to be a pretreatment from the fact that it is carried out prior to the combining of the titanium compound, can be practiced, ordinarily, in the presence or absence of an inactive solvent. For example, a method of causing the magnesium halide and the electron donor compound to contact each other in any of various kinds of mills (in the absence of an inactive solvent) is possible. Alternatively, a method of subjecting the magnesium halide and the electron donor compound to heating treatment (at a temperature of the order of 60° to 150° C.) in an inactive solvent (which can be the same as that specified in section (V) set forth above), which is a pretreatment in the presence of an inactive solvent, can be used.

(ii) Milling or grinding together with the titanium compound

The grinding together of the pretreated solid thus obtained and the titanium compound is carried out under a condition wherein there is substantially no presence of an inactive solvent. Accordingly, in the case of the pretreatment in the absence of an inactive solvent, the contacting treatment with the titanium halogen compound can be carried out immediately thereafter with the materials as they are. However, in the case where the above described pretreatment has been carried out in the presence of an inactive solvent, it is important that the inactive solvent be once substantially removed, and the pretreated solid in dry state and the titanium halogen compound be caused to contact.

The grinding together of the pretreated solid and the titanium halogen compound is carried out in a mill such as a rotary ball mill or a vibrating ball mill or some other grinding apparatus.

(iii) Treatment with the interhalogen compound of halogen and treatment with the inactive organic solvent When this solid composition is treated in an inactive organic solvent with the interhalogen compound or halogen, high performance, which is an objective of this invention, is exhibited. The time at which this treatment with the interhalogen compound or halogen is carried out, however, is not necessarily the same as the time of treatment in the inactive organic solvent. For example, the treatment with the interhalogen compound or the halogen can be carried out before the treatment with the inactive organic solvent.

The reason for the high effectivensss of the solvent treatment in the process of this invention is not clear. However, a reduction in the titanium content of the solid composition before and after the solvent treatment has been observed, and, therefore, the extraction or elution of some kind of titanium compound by the solvent treatment can be presumed to be at least a part of the reason. This invention, however, is not to be limited by this presumed reason.

A number of specific preparation processes are set forth below, it being understood that this invention is not limited thereto.

(a) The magnesium halide and the electron donor compound are subjected to heating treatment in an inactive solvent, and the solvent is removed by evaporation to dryness thereby to produce a dry solid (herein referred to as "pretreated solid"). To this pretreated solid, the titanium halogen compound is added and the two materials are mixed and ground to form what is herein referred to as "mixed ground solid". This mixed ground solid is treated in the inactive organic solvent by adding thereto the interhalogen compound or halogen.

(b) The magnesium halide and the electron donor compound are mixed and ground in a mill thereby to form a pretreated solid, to which the titanium halogen compound is further added, and the mixing and grinding are continued. The mixed ground solid thus obtained is treated in the same manner as in process a) above.

(c) The introduction of the interhalogen compound or halogen is carried out at the time of preparation of the pretreated solid in the processes a) and b) above, and the mixed ground solid is treated in the inactive organic solvent with the interhalogen compound or halogen.

(d) The introduction of the interhalogen compound or halogen is carried out at the time of the contacting treatment step of the titanium halogen compound, and the mixed ground solid is treated, as is in c), with the inactive organic solvent as well as with the interhalogen compound or the halogen.

(4) Quantities of constituent components

The quantities in which the various components are used for producing the solid catalyst component are selected at will and are not to be limited provided that desirable results are obtained.

Ordinarily, the quantity of the electron donor compound used in the preparation of the pretreated solid is from 0.05 to 1:1, preferably 0.1 to 0.5:1, in terms of mole ratio relative to the quantity of the magnesium halide.

The titanium halogen compound can be used in a quantity of 0.005 to 0.333:1 in terms of mole ratio relative to the quantity of the magnesium halide and in a quantity of 0.1 to 8:1, preferably 0.2 to 2:1, in terms of mole ratio relative to the quantity of the electron donor compound contained in the pretreated solid. As mentioned hereinabove, the titanium content is decreased by the inactive organic solvent treatment, but the quantity of the titanium halogen compound described herein is of the value prior to the inactive organic solvent treatment. The quantity eluted of the titanium content due to the solvent treatment is 5 to 95 percent by weight as titanium metal of the titanium content prior to the solvent treatment, and the titanium content in the solid after solvent treatment is ordinarily 5 percent by weight or less (as titanium metal).

The quantity of the interhalogen compound or halogen used is 0.001 to 20:1, preferably 0.005 to 10:1, in terms of mole ratio relative to the quantity of the titanium halogen compound used for the production of the solid catalyst component.

Accordingly, the mole ratio of (i) the magnesium halide to (ii) the electron donor compound to (iii) the titanium halogen compound to the (iv) interhalogen compound or halogen is (from 1,000 to 3) to (from 10 to 0.1) to 1 (unity) to (from 0.001 to 20).

(5) Conditions of preparation of the solid catalyst component (i) Contacting of the magnesium halide and the electron donor compound In the case where the preparation of the pretreated solid is carried out in an inactive solvent, it is desirable that it be carried out at a high temperature and for as long a time period as possible in order to assume that ample contacting between the electron donor compound and the magnesium halide will be accomplished. Ordinarily, the treatment is carried out in an inactive solvent of a boiling point in the range of 60° to 150° C. for 2 to 5 hours at that reflux temperature. Furthermore, after the treatment, the solvent is removed by distillation to dry the residue which is then brought into contact with the titanium halogen compound.

In the case where the pretreated solid is prepared without the use of an inactive solvent, in general, the magnesium halide and the electron donor compound are mixed and ground for a period of 2 to 48 hours in a mill. We have found that if this grinding time is too long, the catalytic properties and the resulting polymer properties (e.g., the polymer bulk density and angle of repose) undesirably become poor.

(ii) Grinding together with the titanium halogen compound

The chemical reaction of the pretreated solid and the titanium halogen compound is undoubtedly a complex-forming reaction of the electron donor compound fixed on the magnesium halide and the titanium halogen compound, and it is presumed that this reaction occurs instantaneously and simultaneously with the introduction of the titanium halogen compound. This is inferred from the phenomenon wherein, when the pretreated solid and the titanium halogen compound are brought into contact, the solid simultaneously becomes yellow or green in color in many cases.

Accordingly, while the contacting of the titanium halogen compound and the pretreated solid can be carried out by a mere mixing, it is desirable for obtaining high catalytic performance that, after this mixing and containing, grinding be carried out further in a mill thereby to attain thorough mixing of the titanium halogen compound and the pretreated solid. A milling treatment time of the order of 24 to 48 hours for this grinding and mixing step is sufficient.

(iii) Inactive organic solvent treatment

The treatment with the inactive organic solvent is ordinarily carried out at a temperature of the order of room temperature to 150° C. and for 30 minutes to 5 hours with agitation. It is desirable that thorough washing be carried out after this treatment.

More specifically, in the case where the inactive organic solvent is a hydrocarbon halide, the treatment may be carried out at a temperature of room temperature to 100° C. for 1 to 3 hours with the use of 50 to 100 ml of the hydrocarbon halide per approximately 10 grams (g.) of the ground solid. Furthermore, in the case where an aromatic hydrocabon compound is used as the inactive organic solvent, the treatment may be carried out under similar conditions and at a temperature of 50° to 140° C. In either case, however, the variation in catalytic performance due to the treatment temperature is not critical.

It is observed that, as a result of this treatment with the inactive organic solvent, the titanium content of the solid composition thus treated decreases. For this reason, it can be said that the terminal point of the treatment with the inactive organic solvent is that instant at which a suitable decrease in the titanium content has been attained. The optimum quantity of decrease in the titanium content differs with various factors such as the kind and quantity of the electron donor compound and titanium halogen compound used, the kind and quantity of the inactive organic solvent used in the solvent treatment, and the temperature and treatment time thereof, but it can be readily determined experimentally.

(iv) Treatment with the interhalogen compound or halogen

The treatment with the interhalogen compound or halogen can be carried out under substantially the same conditions as those of the above described treatment with the inactive organic solvent.

2. Polymerization of olefins

The titanium composition produced in the above described manner is combined, as a transition metal component of a Ziegler catalyst, with a reducing compound of Group I, II, or III of the Periodic Table, particularly an organoaluminum compound expressed by the formula $AlR_nX_{3-n}$ (where n is 1, 2, or 3; X is a halogen; and R is hydrogen or a hydrocarbon residue having from 1 to 10 carbon atoms), thereby to form a catalyst for stereospecific polymerization of α-olefins.

Examples of suitable organoaluminum compounds are triethylaluminum, triisobutylaluminum, trihexylaluminum, trioctylaluminum, diethylaluminum hydride, diisobutylaluminum hydride, and diethylaluminum chloride. The organoaluminum compound to be used is used in a quantity within the range of 1 to 300:1, preferably 1 to 100:1 in terms of weight ratio per titanium atom in the titanium composition.

Examples of possible polymerization methods are the so-called slurry polymerization method wherein an inactive hydrocarbon such as hexane, heptane, or cyclohexane is used as a solvent, the liquid-phase polymerization method wherein a liquefied monomer is used as a solvent, and the gas-phase polymerization method wherein a monomer is present in the gas phase.

The polymerization process can be carried out by a continuous process or by a batch process. The polymerization temperature is of the order of 30° to 120° C., preferably 40° to 80° C., and the polymerization pressure is of the order of from atmospheric pressure to 100 atmospheres, preferably of the order of from atmospheric pressure to 50 atmospheres.

A catalyst comprising a titanium composition according to this invention is highly effective when used in homopolymerization or copolymerization of an olefin such as ethylene, propylene, 1-butene, 4-methyl-pentene-1, and the like.

The titanium composition of the invention is particularly effective as a catalyst component for polymerization of propylene and copolymerization of propylene and from 1 to 15 percent by weight thereof of ethylene. The molecular weight adjustment of the polymer can be carried out by a known method such as that where hydrogen or the like is used.

4. EXPERIMENTS

Example A1

(1) Preparation of titanium composition

Forty (40) grams of anhydrous magnesium chloride obtained by heating in a stream of argon a commercially available anhydrous magnesium chloride at 300° C. for 5 hours and 12 ml of ethyl benzoate were charged in a vibration mill pot of 1-liter internal volume [containing stainless steel (J.I.S., SUS-27) balls 12.7 mm in diameter (apparent volume = 800 ml)] with an argon atmosphere, and were milled for 24 hours at a frequency of 1410 vpm and an amplitude of 3.5 mm.

A solid composition (I) was obtained by placing 5 grams of the resulting milled solid in a flask of 200-ml capacity, adding thereto 50 ml of n-hexane which had been dried and degassed and 10 ml of $TiCl_4$, subjecting the mixture to reaction for 2 hours at the reflux temperature, and then washing the product 10 times with 70 ml of n-hexane by decantation.

To this solid composition was added 50 ml of dried and degassed 1,2-dichloroethane and 0.6g of iodine trichloride ($ICl_3$) (dissolved in 1,2-dichloroethane), and the resulting material was treated for 2 hours at the reflux temperature. Then, the resulting solid was washed 2 times with 70 ml of 1,2-dichloroethane and 3 times with n-hexane by decantation, to obtain a titanium composition, which was employed in the following polymerization as a hexane slurry containing about 10% by weight of solid content.

The concentration of titanium contained in the titanium composition slurry was determined colorimetrically by a color development method using hydrogen peroxide. The following polymerization test was carried out.

(2) Polymerization of propylene (liquid-phase polymerization)

An autoclave of 1 liter internal volume with stirrer was charged with 30 mg of triethyl aluminum, and then with 2.27 ml of the titanium composition slurry (containing 0.5 mg titanium) in an atmosphere of propylene gas, and this was followed by the addition thereto of 700 ml of liquefied propylene monomer. The polymerization was carried out in the autoclave at 70° C. for 1 hour.

After completion of the polymerization, residual monomer was purged to obtain 165 grams of polymer (pp). The yield based on the quantity of titanium atoms (gpp/gTi) was 330,000. The stereospecificity or crystallinity of the polymer (hereinafter referred to as the total II*) was found to be 97.0% by an extraction test of the polymer with boiling n-heptane.

*II: Isotactic Index

Reference Example A1

In order to confirm the effect of the $ICl_3$ treatment, a solid composition slurry was prepared in the same manner as in Example A1 except that the contacting treatment with $ICl_3$ was not carried out. The polymerization was carried out with 1.16 may of the resulting solid composition slurry (containing 1 mg titanium) in the same manner as in Example A1 except for the employment of 40 mg of triethyl aluminum.

179 grams of a polymer was obtained. The yield based on titanium (gpp/gTi) was 179,000, and the total II was 92.9%.

EXAMPLE A2

A titanium composition slurry was prepared under the same conditions as in Example A1 except for the changing of the quantity of treating $ICl_3$ to 0.3 gram.

Polymerization was carried out under the same conditions as in Example A1 by employing 4.54 ml of the resulting titanium composition slurry (containing 1 mg titanium) and 40 mg of triethyl aluminum.

155 g of a polymer was obtained. The yield based on titanium was 155,000, and the total II was 98.5%.

EXAMPLE A3

A titanium composition slurry was prepared under the same conditions as in Example A1 except for the changing of the quantity of treating $ICl_3$ to 0.1 gram.

Polymerization was carried out under the same conditions as in Example A1 by employing 5.00 ml of the resulting composition slurry (containing 0.8 mg titanium) and 32 mg of triethyl aluminum.

104 grams of a polymer was obtained. The yield based on titanium was 130,000, and the total II was 98.5%.

EXAMPLE A4

A titanium composition slurry was prepared using titanium trichloride as follows. Five (5) grams of the milled solid consisting of anhydrous magnesium chloride and ethyl benzoate which had been prepared as in Example A1 was placed in a flask, and to this was added 50 ml of 1,2-dichloroethane and 12.4 ml of a titanium trichloride solution (containing 1.62 grams of $TiCl_3$). The resulting mixture was stirred at room temperature for 2 hours. Incidentally, the titanium trichloride solution was prepared by reducing $TiCl_4$ with $AlEt_2Cl$ by a conventional method, converting the resulting $TiCl_3$ to a so-called $\gamma$-$TiCl_3$ via thermal transition, and subjecting it to milling. To ten (10) grams of the milled product was added 50 ml of 1,2-dichloroethane and 11.8ml of n-butyl ether with stirring to form a dissolved complex.

After contacting with the titanium trichloride solution, the mixture was washed 3 times with 50 ml of 1,2-dichloroethane by decantation and then subjected to a treatment with $ICl_3$.

The $ICl_3$ treatment was carried out by adding to the resulting solid composition 50 ml of 1,2-dichloroethane and 0.5 g of $ICl_3$ (dissolved in 1,2-dichloroethane) and heating the resulting materials at the reflux temperature for 2 hours. After the treatment, the treated product was washed by decantation (2 times with 1,2-dichloroethane and 5 times with n-hexane) to obtain a titanium composition slurry (in n-hexane).

Polymerization was carried out under the same conditions as in Example A1 by employing 1.39 ml of the titanium composition slurry (containing 1 mg titanium) and 40 mg of triethyl aluminum.

173 g of a polymer was obtained. The yield based on titanium was 173,000, and the total II was 93.0%.

Reference Example A2

In order to confirm the effect of the $ICl_3$ treatment, a solid composition was prepared in the same manner as in Example A4, and polymerization was carried out by the procedure of Example A1 by employing 0.42 ml of the solid composition slurry (containing 1 mg titanium) which had not been subjected to the contact-treatment with $ICl_3$, and 40 mg of triethyl aluminum. The polymerization temperature employed was 75° C.

Twenty (20) minutes after starting polymerization, the polymerization reaction was discontinued since the resulting polymer in the autoclave formed a lumpy mass and stirring could not be continued further.

232 grams of a sticky polymer was obtained. The yield based on titanium was 232,000, and the total II was 67.0%.

EXAMPLE A5

A vibration mill pot of 1-liter internal volume was charged with 40 g of anhydrous magnesium chloride and 14.2 g of an ethyl benzoate complex of titanium tetrachloride in an atmosphere of argon, and this was followed by mixing and milling under the same conditions as in Example A1. Incidentally, the ethyl benzoate complex of titanium tetrachloride was prepared by adding an n-hexane solution of ethyl benzoate (ethyl benzoate/$TiCl_4$ = 1 molar ratio) dropwise to an n-hexane solution of $TiCl_4$ at 0° C., aging the mixture at room temperature, and subjecting it to washing and drying to obtain a yellow crystalline solid.

Five (5) grams of the mixed and milled solid was placed in a 200 ml flask, and then 50 ml of 1,2-dichloroethane and 0.6 g of iodine trichloride (dissolved in 1,2-dichloroethane) were added thereto. The materials were then treated at the reflux temperature for 2 hours. After the treatment, the resulting solid was washed by decantation (2 times with 70 ml of 1,2-dichloroethane and 3 times with n-hexane) to obtain a titanium composition slurry (in n-hexane).

Polymerization was carried out under the same conditions as in Example A1 by employing 0.61 ml of the titanium composition slurry (containing 0.3 mg titanium) and 20 mg of triethyl aluminum.

157 g of a polymer was obtained. The yield based on titanium was 523,000, and the total II was 83.5%.

Reference Example A3

About 2.2 grams of the milled solid which had been obtained as in Example A5 was used to prepare a milled solid slurry (in 100 ml of n-hexane as solvent). Polymerization was carried out in the same manner as in Example A1 by employing 0.61 ml of the resulting slurry (containing 0.5 mg titanium) and 40 mg of triethyl aluminum. The polymerization was discontinued 37 minutes after starting polymerization since the polymer formed a lumpy mass in autoclave and no further stirring could be carried out. 178 grams of a clay-like massed polymer was obtained. The yield based on titanium was 356,000, and the total II was 47.9%.

Comparing the results of Example 5 with those of Reference Example A3, the effect of $ICl_3$ treatment on the resulting total II is clearly indicated.

EXAMPLE A6

A vibration mill pot of 1-liter internal volume was charged with 40 g of anhydrous magnesium chloride and 12.6 g of an ethyl benzoate complex of titanium trichloride in an argon atmosphere. Then mixing and milling were carried out under the same conditions as in Example A1.

The ethyl benzoate complex of titanium trichloride was prepared by adding ethyl benzoate at room temperature to a dissolved complex solution of titanium trichloride, which had been prepared under the same conditions as in Example A4, and washing and drying the resulting greenish gray crystals. Five (5) grams of the mixed and milled solid was placed in a 200 ml flask, and 50 ml of 1,2-dichloroethane and 0.5 g of iodine trichloride (dissolved in 1,2-dichloroethane) were added thereto. This was followed by treatment at reflux temperature for 2 hours. After the treatment, the resulting solid was washed by decantation to obtain a titanium composition slurry.

Polymerization was carried out under the same conditions as in Example A1 by employing 0.71 ml of the titanium composition slurry (containing 0.5 mg titanium) and 20 mg of triethyl aluminum.

117 g of a polymer was obtained. The yield based on titanium was 234,000, and the total II was 90.3%.

Reference Example A4

About 2.3 grams of the milled solid obtained as in Example A6 was used to prepare a milled solid slurry (in 100 ml of n-hexane used as solvent). Polymerization was carried out in the same manner as in Example A1 by employing 0.81 ml of the slurry (containing 0.5 mg titanium) and 20 mg of triethyl aluminum.

The polymerization was discontinued 50 minutes after starting polymerization since the resulting polymer in the autoclave formed a mass. 180 g of a polymer was obtained. The yield based on titanium was 360,000, and the total II was 59.9%. The difference between the total II values in Example A6 and Reference Example A4 is clearly indicated.

EXAMPLE A7

In this example, $SiCl_4$ was employed as a milling additive. A vibration mill pot was charged with 40 g of anhydrous magnesium chloride, 12 ml of ethyl benzoate and 5.4 ml of $SiCl_4$. These materials were treated under the same conditions as in Example A1 (wherein the milling time was 16 hours) to prepare a milled solid. Then, the reaction with $TiCl_4$ and contacting treatment with $ICl_3$ were carried out under the same conditions as in Example A1.

Polymerization was carried out in the same manner as in Example A1 by employing 2.94 ml of the resulting titanium composition slurry (containing 0.5 mg titanium) and 40 mg of triethyl aluminum.

145 g of a polymer was obtained. The yield based on titanium was 290,000, and the total II was 95.6%.

EXAMPLE A8

Milling was carried out under the same conditions as in Example A1 except that 40 g of anhydrous magnesium chloride and 9.0 ml of methyl methacrylate were charged into a vibration mill pot of 1-liter internal volume in an argon atmosphere, and milling was carried out for 16 hours.

Five (5) grams of the resulting milled solid was placed in a 200-ml flask. The reaction with $TiCl_4$ and contacting treatment with $ICl_3$ (wherein 0.5 g of $ICl_3$ was employed) were carried out in the same manner as in Example A1 to obtain a titanium composition slurry.

Polymerization was carried out according to the procedure of Example A1 by employing 3.18 ml of the resulting titanium composition slurry (containing 2.0 mg on titanium atom basis) and 80 mg of triethyl aluminum.

61 g of a polymer was obtained. The yield based on titanium was 30,500, and the total II was 98.1%.

EXAMPLE A9

The process of Example A1 was repeated so far as the contacting of the reaction system with $TiCl_4$, and then the system was contacted with ICl (iodine chloride). Thus, 50 ml of 1,2-dichloroethane used as solvent and 0.093 ml of ICl (0.3g) were added to the solid composition (I). Then treatment at the reflux temperature was carried out for 2 hours. After the treatment, the resulting solid was washed by decantation to obtain a titanium composition slurry.

Polymerization was carried out under the same conditions as in Example A1 by employing 1.85 ml of the titanium composition slurry (containing 0.5 mg titanium) and 25 mg of triethyl aluminum.

As a result, 107 g of a polymer was obtained. The yield based on titanium was 214,000, and the total II was 96.3%.

EXAMPLE A10

The process of Example A1 was repeated so far as the contacting of the reaction system with $TiCl_4$, and then the system was contacted with $I_2$(iodine). Thus, 50 ml of 1,2-dichloroethane used as solvent and 0.5 g of $I_2$ were added to the solid composition. This was followed by treatment at the reflux temperature for 2 hours. After this treatment, the resulting solid was washed by decantation to obtain a titanium composition slurry.

Polymerization was carried out under the same conditions as in Example A1 by employing 1.15 ml of the titanium composition slurry (containing 0.5 mg titanium) and 30 mg of triethyl aluminum.

As a result, 62 g of a polymer was obtained. The yield based on titanium was 124,000, and the total II was 97.6%.

EXAMPLE A11

A titanium composition slurry was prepared in the same manner as in Example A10 except that 0.35 g of $Br_2$ (Bromine) was used instead of 0.5g of $I_2$.

Polymerization was carried out under the same conditions as in Example A1 by employing 1.92 ml of the resulting titanium composition slurry (containing 1 mg titanium) and 40 mg of triethyl aluminum.

As a result, 138 g of a polymer was obtained. The yield based on titanium was 138,000, and the total II was 96.4%.

EXAMPLE A12

A solid component (A) was prepared by mixing and milling 20 g of anhydrous magnesium chloride and 6 ml of ethyl benzoate for 48 hours as in Example A1 (1).

Separately, a solid component (B) was prepared by mixing and milling 20 g of titanium trichloride (aluminum-reduced titanium trichloride) and 14.4 ml of ethyl benzoate for 48 hours in the same way.

Then, a solid component (C) was prepared by mixing and milling 15.8 g of the component (A) and 4.2 g of the component (B) for 5 hours.

Five (5) grams of the solid component (C) was placed in a 200-ml flask, and 100 ml of n-hexane and 0.4 g of $ICl_3$ were added thereto, after which treatment at the reflux temperature was carried out for 4 hours.

The resulting solid, after the treatment, was washed by decantation to obtain a titanium composition.

Polymerization was carried out as in Example A1 by employing 3.27 ml of the resulting titanium composition slurry (containing 1 mg titanium) and 80 mg of triethyl aluminum as in Example A1.

As a result, 186 g of a polymer was obtained. The yield based on titanium atom (gpp/gTi) was 186,000, and the total II was 94.2%.

EXAMPLE A13

A solid component (A) was prepared by mixing and milling 20 g of anhydrous magnesium chloride and 6 ml of the ethyl benzoate for 48 hours according to the procedure set forth in Example A1 (1).

Separately, a solid component (B) was prepared by mixing and milling 20 g of titanium trichloride (aluminum-reduced titanium trichloride) and 11.5 ml of ethyl benzoate for 48 hours in the same way.

Then, a solid component (C) was prepared by mixing and milling 16.08 g of the solid component (A) and 3.92 g of the solid component (B) for 5 hours.

Five (5) grams of the solid component (C) was placed in a 200-ml flask, and 100 ml of n-hexane and 0.18 g of $ICl_3$ were added thereto. The treatment at reflux temperature was carried out for 4 hours.

After the treatment, the resulting solid was washed by decantation to obtain a titanium composition.

Polymerization was carried out as in Example A1 by employing 4.42 ml of the resulting titanium composition slurry (containing 1 mg titanium) and 80 mg of triethyl aluminum. The polymerization was discontinued in 20 minutes.

As a result, 184 g of a polymer was obtained. The yield based on titanium atom was 184,000 for the polymerization time of 20 minutes, and the total II was 94.5%.

Reference Example A5

In this experiment, 2.79 g of the solid component (C) which had been obtained as in Example A13 was used to prepare a catalyst slurry (in 100 ml of n-hexane as solvent). Polymerization was carried out as in Example A1 by employing 2.87 ml of the slurry (containing 2.36 mg titanium) and 80 mg of triethyl aluminum. The polymerization was discontinued in 10 minutes.

As a result, 257 g of a polymer was obtained. The yield based on titanium atom for 10 minutes was 109,000, and the total II was 76.1%.

EXAMPLE B1

(1) Preparation of titanium composition

Twenty (20) grams of anhydrous magnesium chloride and 9.0 ml of ethyl benzoate (ethyl benzoate/magnesium chloride = 0.3 in molar ratio) were placed in a 500-ml three-necked flask and suspended in 300 ml of 1,2-dichloroethane. This was followed by thermal treatment under reflux with stirring for 3 hours.

After the treatment, 1,2-dichloroethane was stripped off under a stream of argon until almost all of the dichloroethane was removed, and then the system was dried under reduced pressure to obtain a white powder (pretreated solid).

All of the resulting white powder and 6.92 ml of TiCl$_4$ (ethyl benzoate/TiCl$_4$ = 1.0 in molar ratio) were charged in a vibration pot mill of 1-liter internal volume [in which stainless steel (J.I.S., SUS-27) balls 12.7 mm in diameter were placed (apparent volume = 800 ml)] and mixed with each other. It was observed that the white powder changed to yellow powder as soon as it was contacted by the TiCl$_4$ (which may be attributed to a complex-forming reaction of TiCl$_4$ with ethyl benzoate).

The mixture was milled for 24 hours in the mill pot at a frequency of 1410 vpm and an amplitude of 3.5 mm. About 9 g of the resulting milled solid was placed in a 200-ml flask.

Into the flask were placed 50 ml of 1,2-dichloroethane used as an inert organic solvent and 0.1 g of ICl$_3$ (dissolved in 1,2-dichloroethane) used as an interhalogen, which were stirred at 75° C. for 2 hours. The resulting solid was washed by decantation (6 times with 100 ml of n-hexane) to obtain a titanium composition (a catalyst component of the present invention).

The concentration of titanium contained in the titanium composition slurry was determined colorimetrically by hydrogen peroxide-color development method. The composition slurry was used for the following polymerization test. (The titanium concentration in the slurry was 0.938 mg/ml.) Incidentally, the titanium content in the titanium composition solid was analyzed and found to be 1.82% by weight.

(2) Polymerization of propylene (liquid-phase polymerization)

An autoclave of 1-liter internal volume with stirrer was charged with 13 mg of triethyl aluminum (TEA) and then with 0.426 ml of the titanium composition slurry (containing 0.4 mg on titanium atom basis, the molar ratio of Al/Ti being 13.6) in an atmosphere of propylene gas, after which, 850 ml of liquefied propylene monomer was added. Then, polymerization was started and carried out at 70° C. for 1 hour.

After completion of the polymerization, the residual monomer was purged to obtain 222.5 g of polymer (pp). Thus, the yield based on the amount of titanium atom (ggp/gTi) was 556,200, and the yield based on titanium composition (gpp/g titanium composition) was 10,000 (these yields being calculated from the titanium content in the titanium composition).

The stereospecificity of the polymer (the total II) was found to be 95.7% by an extraction test of the polymer with boiling n-heptane.

EXAMPLES B2-B10

In accordance with the process for preparation of the titanium composition set forth in Example B1, solid materials were prepared with different constitutions of the pretreated solid compositions (ratio of ethyl benzoate (EB)/Mg Cl$_2$) and the milled solid composition (ratio of ethyl benzoate/TiCl$_4$), and this was followed by treatment with ICl$_3$. In the ICl$_3$ treatment, the solvent species, treatment conditions and washing method were the same as in Example B1.

Polymerization of propylene was carried out as in Example B1, the results being shown in Table 1.

Table 1

| Examples | Preparation of titanium-containing solid | | Interhalogen or Halogen treatment ICl$_3$ treatment | | Ti content in titanium composition | Conditions of Polymerization | | | Results of polymerization | | The total II |
|---|---|---|---|---|---|---|---|---|---|---|---|
| | EB/MgCl$_2$ *a) | EB/TiCl$_4$ *b) | ICl$_3$ g, | ° C./hr | (% by weight) | Ti (mg) | TEA (mg) | A/Ti (molar ratio) | yield based on titanium | Yield based on titanium composition | |
| B2 | 0.3 | 2.0 | 0.1 | 75/2 | 1.16 | 0.5 | 16 | 13.4 | 524,000 | 6,100 | 95.7 |
| B3 | " | 1.6 | " | " | 1.13 | 0.4 | 17 | 17.8 | 616,000 | 7,200 | 96.7 |
| B4 | " | 1.3 | " | " | 1.50 | 0.4 | 14 | 14.7 | 414,000 | 6,200 | 97.5 |
| B5 | " | 1.0 | " | " | 1.54 | 0.35 | 13 | 15.6 | 623,000 | 9,600 | 94.2 |
| B6 | " | 0.9 | " | " | 1.94 | 0.4 | 14 | 14.7 | 620,000 | 11,900 | 93.7 |
| B7 | 0.4 | 1.0 | " | " | 1.58 | 0.35 | 18 | 21.6 | 791,000 | 12,500 | 94.2 |
| B8 | " | " | " | " | " | 0.4 | 16 | 16.8 | 558,000 | 8,800 | 96.1 |
| B9 | 0.5 | 1.2 | " | " | 1.43 | 0.4 | 15 | 15.7 | 553,000 | 7,900 | 95.1 |
| B10 | " | 1.0 | " | " | 1.80 | 0.4 | 15 | 15.7 | 588,000 | 10,600 | 96.2 |

*a): Constitution of the pretreated solid (molar ratio)
*b): Constitution of the milled solid (molar ratio)

Reference Examples B1, B2 and B3

These Reference Examples are set forth to show that very low catalytic performance is exhibited when a milled solid which was obtained according to the process for preparation of the catalyst component in Example B1 is used by itself as a catalyst.

Pretreated solids and milled solids were prepared with the constitutions shown in Table 2 and according to the order of preparation steps and process as in Example B1. The resulting milled solid was used without further treatment to prepare a slurry in n-hexane. Polymerization was carried out by employing the resulting slurry, the results of which are shown in Table 2.

It is clear from Examples B1 through B10 and Reference Examples B1, B2, and B3 that the effects on the yield based on titanium, the yield based on titanium composition and the total II are markedly enhanced by treating the milled solid in an inactive organic solvent in the presence of an interhalogen or a halogen.

by treatment at 75° C. for 2 hours. After the treatment, the resulting solid was washed 6 times with 100 ml of n-hexane by decantation to obtain a titanium composition.

The titanium content in the titanium composition solid was analyzed and found to be 1.68% by weight.

(2) Polymerization of propylene (liquid-phase polymerization)

Polymerization was carried out according to the conditions and process in Example B1 (wherein titanium = 0.35 mg, TEA = 12 mg and Al/Ti = 14.4 in molar ratio), by employing the resulting titanium composition slurry.

As a result, 260 g of a polymer was obtained. Thus, the yield based on titanium (gpp/gTi) was 743,000, and Table 2

| Reference Examples | Preparation of milled solid | | Ti content of milled solid (% by weight) | Conditions of polymerization | | | Results of polymerization | | |
|---|---|---|---|---|---|---|---|---|---|
| | EB/MgCl$_2$ | EB/TiCl$_4$ | | Ti (mg) | TEA (mg) | Al/Ti (molar ratio) | Yield based on titanium | Yield based on milled solid | The total II |
| B1 | 0.3 | 3 | 2.35 | 0.4 | 14 | 14.7 | 184,000 | 4,300 | 76.3 |
| B2 | " | 6 | 1.46 | 0.4 | 14 | 14.7 | 73,000 | 1,100 | 86.8 |
| B3 | 0.5 | 2.5 | 2.39 | 0.5 | 25 | 21.0 | 126,000 | 3,000 | 77.7 |

*EB/MgCl$_2$ : Constitution of pretreated solid
EB/TiCl$_4$ : Constitution of milled solid

EXAMPLE B11

(1) Preparation of titanium composition

This Example shows preparation of a pretreated solid without employing an inactive solvent.

In an argon atmosphere, 20 g of anhydrous MgCl$_2$ and ethyl benzoate were charged into the abovementioned vibration mill pot and caused to contact each other. In this case, the ethyl benzoate was added to the mill pot in two lots each of 4.5 ml, in which the milling time was 16 hours, respectively. The molar ratio of total ethyl benzoate/MgCl$_2$ was 0.3.

To the pretreated solid thus prepared was added 7.7 ml of TiCl$_4$ (ethyl benzoate/TiCl$_4$ = 0.9 in molar ratio).

(The white pretreated solid changed to yellow solid as soon as it was contacted with TiCl$_4$. This may be attributed to a complex-forming reaction with the ester.) The mixture was subjected to milling for 24 hours to obtain a milled solid.

About 10 g of the milled solid was placed in a 200-ml three-necked flask and 100 ml of 1,2-dichloroethane and 0.1 g of ICl$_3$ were added thereto, and this was followed the yield based on titanium composition (gpp/gTi composition) was 12,500. The total II determined by boiling n-heptane extraction test was 96.3%.

EXAMPLES B12 through B26

Various constitutions of pretreated solids (ratios of ethyl benzoate/Mg Cl$_2$, ethyl benzoate being added in two lots as in Example B11) and those of milled solids were employed to prepare solid materials according to the process for preparation of the titanium composition in Example B11, and this was followed by treatment with ICl$_3$. Polymerization of propylene was carried out by employing the resulting titanium compositions, the results of which are shown in Table 3.

Table 3

| Examples | Preparation of titanium-containing solid | | Interhalogen or Halogen treatment ICl$_3$ treatment | | Ti content in titanium composition (% by weight) | Conditions of polymerization | | | Results of polymerization | | |
|---|---|---|---|---|---|---|---|---|---|---|---|
| | EB/MgCl$_2$*a) | EB/TiCl$_4$*b) | ICl$_3$ g | °C./hr. | | Ti (mg) | TEA (mg) | Al/Ti (molar ratio) | Yield based on titanium | Yield based on titanium composition | The total II |
| B12 | 0.2 | 1.8 | 0.2 | 75/2 | 1.54 | 0.5 | 13 | 10.9 | 484,000 | 7,500 | 93.2 |
| B13 | " | 1.2 | 0.2 | " | 1.97 | 0.4 | 13 | 13.6 | 650,000 | 12,800 | 92.1 |
| B14 | " | 1.0 | " | " | 1.96 | 0.3 | 10 | 14.0 | 390,000 | 7,600 | 93.7 |
| B15 | " | " | 0.1 | " | 1.97 | 0.4 | 14 | 14.7 | 667,000 | 13,100 | 90.0 |
| B16 | 0.3 | 1.3 | " | " | 1.56 | 0.4 | 12 | 12.6 | 627,000 | 9,800 | 96.0 |
| B17 | " | 1.1 | " | " | 1.74 | 0.4 | 14 | 14.7 | 625,000 | 10,900 | 97.6 |
| B18 | " | 1.0 | " | " | 1.82 | 0.4 | 16 | 16.8 | 602,000 | 11,000 | 94.8 |
| B19 | 0.35 | " | " | " | 1.50 | 0.4 | 14 | 14.7 | 544,000 | 8,200 | 96.5 |
| B20 | 0.4 | 2.0 | " | " | 1.15 | 0.4 | 15 | 15.7 | 121,000 | 1,400 | 96.7 |
| B21 | " | 1.6 | " | " | 1.18 | 0.4 | 15 | 15.7 | 107,000 | 1,300 | 97.5 |
| B22 | " | 1.3 | 0.2 | " | 1.35 | 0.4 | 16 | 16.8 | 343,000 | 4,600 | 96.5 |
| B23 | " | 1.0 | " | " | 1.56 | 0.4 | 13 | 13.6 | 538,000 | 8,400 | 97.1 |
| B24 | 0.45 | 1.0 | 0.1 | " | 1.60 | 0.4 | 15 | 15.7 | 725,000 | 11,600 | 95.2 |
| B25 | 0.5 | 1.3 | " | " | 1.36 | 0.4 | 14 | 14.7 | 466,000 | 6,300 | 96.5 |
| B26 | " | 1.0 | " | " | 1.90 | 0.4 | 13 | 13.6 | 586,000 | 11,100 | 94.7 |

*a) : Constitution of the pretreated solid (molar ratio)
*b) : Constitution of the milled solid (molar ratio)

EXAMPLE B27

This example is to illustrate the case wherein the treatment with an interhalogen compound or a halogen is carried out in the course of preparation of a pretreated solid.

The process for preparation of a titanium composition was employed, but iodine (I$_2$) was added in the course of preparation of a pretreated solid. Thus, a pretreated solid was obtained by employing 20 g of anhydrous magnesium chloride, 10.5 ml of ethyl benzoate (EB/MgCl$_2$ = 0.35 in molar ratio), 2.66 g of iodine (I$_2$/MgCl$_2$ = 0.05) and 300 ml of 1,2-dichloroethane.

A milled solid was obtained under the conditions and by the process in Example B1 except that 8.1 ml of TiCl$_4$ was added (EB/TiCl$_4$ = 1.0 in molar ratio) before the milling step. About 10 g of the milled solid and 50 ml of 1,2-dichloroethane was subjected to treatment at 75° C. for 2 hours.

Polymerization was carried out as in Example B1 by employing the resulting titanium composition slurry, the results of which are as follows.

| Yield based on titanium | 490,000 |
|---|---|
| Yield based on titanium composition | 8,800 |
| The total II | 95.0% |

EXAMPLE B28

A titanium compostion was prepared by further adding 0.2 g of ICl$_3$ when the milled solid was treated in 1,2-dichloroethane as in Example B27. Thus, the treatment was carried out in the presence of ICl$_3$ and I$_2$ in 1,2-dichloroethane. In other words, the process for preparation of a titanium composition in this example is the same as that of Example B27 except that 0.2 g of ICl$_3$ was further added into 1,2-dichloroethane.

Polymerization was carried out as in Example B1 by employing thus prepared titanium composition slurry, the results of which are shown below.

| Yield based on titanium | 515,000 |
|---|---|
| Yield based on titanium composition | 8,000 |
| The total II | 97.2% |

EXAMPLE B29, B30, and B31

In accordance with the data shown in Table 4, titanium compositions were prepared by treating milled solids with various inactive organic solvents in the presence of ICl$_3$, and polymerizations were carried out by using the resulting titanium compositions. The results are also shown in Table 4.

Table 4

| Examples | Preparation of milled solid | Treating solvent ICl$_3$ g, °C./hr | Ti Content in titanium composition (% by weight) | Results of polymerization$^{c)}$ | | |
|---|---|---|---|---|---|---|
| | | | | Yield based on titanium | Yield based on titanium composition | The total II |
| B29 | a) | toluene 0.1 75/2 | 2.01 | 505,000 | 10,200 | 93.6 |
| B30 | b) | mesitylene mesitylene 0.1 75/2 | 2.11 | 378,000 | 8,000 | 93.8 |
| B31 | a) | chlorobenzene 0.1 75/2 | 1.82 | 743,000 | 13,500 | 93.3 |

$^{a)}$Preparation of a milled solid according to Example B6
$^{b)}$Preparation of a milled solid according to Example B5
$^{c)}$Polymerizations were carried out as in Example B1
(Ti = 0.4 mg, TEA = 14 mg, Al/Ti = 14.7 in molar ratio).

We claim:

1. In a process for producing a catalyst component for polymerization of olefins in which a solid composition for said catalyst component is prepared by combining a magnesium halide, an electron donor compound, and a titanium halogen compound, the improvement which comprises contacting said solid composition with a member selected from the group consisting of interhalogen compounds and halogens in a mole ratio of about 0.001 to 20:1 of said interhalogen compound or halogen relative to said titanium halogen compound.

2. A process as claimed in claim 1 in which the solid composition, after being thus contacted with said selected member, is washed with an inactive organic solvent.

3. A process as claimed in claim 1 in which the contact of the solid composition with said selected member comprises causing the solid composition and said selected member to contact each other in an inactive organic solvent.

4. A process as claimed in claim 2 in which the inactive organic solvent is a halohydrocarbon.

5. A process as claimed in claim 3 in which the inactive organic solvent is a halohydrocarbon.

6. A process as claimed in claim 1 in which said process of combining a magnesium halide, an electron donor compound, and a titanium halogen compound includes a step of grinding together at least two of the stated components.

7. A process as claimed in claim 1 in which the electron donor compound is an ester of a carboxylic acid having from 1 to 12 carbon atoms and an alcohol having from 1 to 12 carbon atoms.

8. A process as claimed in claim 7 in which the ester is an ester of benzoic acid and a monohydric alcohol having from 1 to 12 carbon atoms.

9. A process as claimed in claim 1 in which the titanium halogen compound is defined by the formula Ti(OR)$_m$X$_{n-m}$ wherein R is an alkyl group; X is a halogen; n is 3 or 4; m is zero or an integer from 1 to 4; and n is equal to or greater than m.

10. A process as claimed in claim 9 in which the titanium halogen compound is a member selected from the group consisting of titanium tetrachloride and titanium trichloride.

11. A process as claimed in claim 1 in which the mole ratio of the magnesium halide to the electron donor compound to the titanium halogen compound to the interhalogen compound or halogen is (from 1,000 to 3) to (from 10 to 0.1) to 1 to (from 0.001 to 20).

12. A process as claimed in claim 1 in which the solid composition is prepared by the process steps of:
(1) contacting the magnesium halide with the electron donor compound thereby to produce a first composition containing the magnesium halide;
(2) grinding said first composition together with the titanium halogen compound in liquid substantially in the absence of a solvent thereby to produce a ground second composition containing the magnesium halide;

(3) contacting said second composition with said member selected from the group consisting of interhalogen compounds and halogens; and (4) washing the second composition containing the magnesium halide with an inactive organic solvent at the same time as or after the above step (3).

13. A process as claimed in claim 12 in which the step (1) comprises grinding the magnesium halide and the electron donor compound in the absence of a solvent.

14. A process as claimed in claim 12 in which the step (1) comprises heating the magnesium halide and the electron donor compound in an inactive solvent at a temperature of 60° to 150° C.

15. A process as claimed in claim 12 in which the washing of the step (4) comprises extracting of the titanium content of the second composition.

16. A catalyst component for polymerization of olefins obtained by the process of claim 1.

* * * * *